United States Patent [19]

Gratzfeld et al.

[11] 4,378,995
[45] Apr. 5, 1983

[54] IRON BLUE PIGMENT, PROCESS FOR MAKING THE SAME AND USE

[75] Inventors: Everhard Gratzfeld, Wesseling; Eva Clausen; Helmut Reinhardt, both of Cologne; Hans Schaefer, Hanau, all of Fed. Rep. of Germany

[73] Assignee: Degussa Aktiengesellschaft, Frankfurt am Main, Fed. Rep. of Germany

[21] Appl. No.: 309,425

[22] Filed: Oct. 6, 1981

[30] Foreign Application Priority Data

Oct. 10, 1980 [DE] Fed. Rep. of Germany ....... 3038328

[51] Int. Cl.$^3$ .................... C09D 11/00; C01C 3/12
[52] U.S. Cl. .................... 106/15.05; 106/22; 106/171; 106/304; 423/367
[58] Field of Search ............ 106/304, 171, 22, 20, 106/15.05; 423/367

[56] References Cited

U.S. PATENT DOCUMENTS 3,985,571  10/1976  Reinhardt et al. ............. 106/304
4,046,861  9/1977   Reinhardt et al. ............. 106/304

FOREIGN PATENT DOCUMENTS 2453014  3/1976  Fed. Rep. of Germany .

*Primary Examiner*—Theodore Morris
*Attorney, Agent, or Firm*—Beveridge, DeGrandi and Kline

[57] ABSTRACT

Iron blue pigment (DIN 55 906) is produced by white paste precipitation and subsequent oxidation of the white paste. Alkali or alkali metal ions i.e. sodium and potassium ions, cyanide or complex iron cyanide ions and iron ions are used as raw materials. The iron blue pigment according to the invention is characterized by a potassium content of 0.5–4.5% by weight, preferably 0.5–2.0% by weight, a sodium content of 0.2–1.0% by weight, an ammonium content of 2.0–4.5% by weight, preferably 3.0–4.5% by weight, a coloring power in accordance with DIN 53 204 and DIN 53 234 of 5–15% above the Vossen Blue 705 Standard and the following color intervals (determined in accordance with DIN 53 204 and DIN 53 234 in conjunction with DIN 6174, in relation to Vossen Blue 705 as standard):

$\Delta L$: $-0.7$ to $-1.5$
$\Delta a$: $-0.5$ to $1.5$
$\Delta b$: $-0.6$ to $-2.3$
$\Delta C$: $+0.5$ to $2.0$ In order to save potassium ions, the white paste precipitation of the iron blue pigment according to the invention is carried out in two phases, potassium ions being used as alkali ions in the first phase and sodium ions in the second phase. After removal of the reaction salts and addition of ammonium salts, the white paste suspension thus obtained is aged and subsequently oxidized to iron blue pigment by known methods. The iron blue pigment can be used as a pigment for the production of printing inks, colored paints, colored varnishes and as coloring agents for fungicides.

13 Claims, No Drawings

IRON BLUE PIGMENT, PROCESS FOR MAKING THE SAME AND USE

Iron blue pigment (DIN 55 906) is known under the designations Berlin blue, Paris blue, Prussian blue, mineral blue, steel blue, ferrocyanic blue and bronze blue. Iron blue pigment is also designated in the literature as iron blue (Ullmann's Enzyklopädie der Technischen Chemie, Fourth Edition, Vol. 18, p. 623 et seq.).

Iron blue pigment is highly valued in the printing ink and paint industries and for the coloring of fungicides in view of its intensive coloring power and its low price by comparison with organic pigments. The characteristic properties of a high-quality iron blue pigment are:
- high color intensity;
- good dispersion capacity;
- pure color shade;
- favorable rheological behavior;
- low reaction capacity; and
- adequate resistance to reducing compounds.

An iron blue pigment which possesses all these properties simultaneously is of particular value for the pigment-processing industry.

Iron blue pigment is an alkaline ferriferrocyanide having the general formula $$Me(I)Fe(III) Fe(II)(CN)_6 \cdot H_2O$$

in which Me(I) is a monovalent alkali metal ion. The pigment is produced by precipitation from hexacyanoferrate (II) solutions and iron (II) salt solutions via the intermediate stage of so-called white paste or Berlin white having the general formula $$Me(I)_2Fe(II) Fe(II)(CN)_6 \cdot H_2O$$

which is oxidized in appropriate cases by the addition of alkali metal salts after a heat treatment (ageing).

Only iron blue pigment compounds containing as alkali metal in the molecule predominently potassium and/or ammonium ions meet the requirements of paint technology and are in consequence of practical importance for the pigment processing industry. Iron blue pigments which contain only sodium and ammonium as alkali metal ions in the molecule virtually never have the pure color shade of iron blue pigments containing potassium.

Known processes for the production of iron blue pigment primarily use potassium ferrocyanide as raw material, although attempts are being made in a progressively increasing extent on grounds of cost to replace potassium ferrocyanide by sodium ferrocyanide. In processes which make use of sodium ferrocyanide, potassium and/or ammonium salts are added during the white paste precipitation and ageing stages.

In order to replace a proportion of the costly potassium ferrocyanide by the less expensive sodium salt, processes are known for the mixing of potassium and sodium ferrocyanides or for the introduction of the correspondiang alkali metals during the production of these raw materials, so that ferrocyanide solutions containing potassium and sodium ions are obtained in this way (see DE-OS No. 24 53 014).

According to existing experience, however, limits are imposed on the mixing ratios that can be used. The potassium ferrocyanide fraction should be for example, at least 50 mol % (in a 50 mol % sodium ferrocyanide) in order to obtain iron blue pigments of determined coloring power, and potassium salts must also be added during the ageing process. Smaller proportions of potassium ferrocyanide result in lower qualities of the iron blue pigment. For varieties with a particularly high coloring power, the potassium ferrocyanide fraction must be at least 70 mol % (in the case of 30 mol % sodium ferrocyanide). Some special varieties must be produced from potassium ferrocyanide alone.

The object of the invention is an iron blue pigment, characterized by a potassium content of 0.5–4.5% by weight, preferably 0.5–2.0% by weight, a sodium content of 0.2–1.0% by weight, an ammonium content of 2.0–4.5% by weight, preferably 3.0–4.5% by weight, a coloring power in accordance with DIN 53 204 and DIN 53 234 of 5–15% above the Vossen Blue 705 Standard and the following color intervals (determined in accordance with DIN 53 204 and DIN 53 234 in conjunction with DIN 6174, in relation to Vossen Blue 705 as standard):

$\Delta L$: $-0.7$ to $-1.5$
$\Delta a$: $-0.5$ to $1.5$
$\Delta b$: $-0.6$ to $-2.3$
$\Delta C$: $+0.5$ to $2.0$ The iron blue pigment Vossen blue 705 is described in Ullmann's Enzyklopädie der Technischen Chemie, Fourth Edition, Vol. 18, page 623. It is available commercially from Degussa AG, Weissfrauenstrasse 9, 6000 Frankfurt 1, Germany.

The iron blue pigment according to the invention may have a residual moisture content of about 3.5% by weight (determined in accordance with DIN 53 198) and a CN content of about 44% by weight (determined in accordance with the Feld method).

A further object of the invention is an improvement in the process for the production of iron blue pigment by means of white paste precipitation, followed by oxidation of the white paste which comprises carrying out the white paste precipitation with alkali metal ions, cyanide ions or complex iron cyanide ions and iron ions in two phases, whereby potassium ions are added as alkali metal ions in the first phase of white paste precipitation and sodium ions in the second phase. The white paste suspension thus obtained is diluted with water, the supernatant solution decanted, ammonium salts added, the suspension heated to the boiling point thereof and this temperature maintained for a sufficiently long period followed by cooling, addition of inorganic salts in the form of an aqueous solution and oxidizing agents in the form of an aqueous solution and, after oxidation, separation of the iron blue pigment from the solution and processing by known methods. The solution temperatures in the first and second phases can be mutually adjusted in such a way that the mixture obtained has a temperature of 20°–60° C., preferably 30°–50° C.

Hydrochloric acid or sulfuric acid can be used as the inorganic acid to provide the inorganic salts. Potassium chlorate, sodium chlorate or hydrogen peroxide can be used as the oxidizing agent and potassium or sodium dichromate may also be used. The ratio of potassium to sodium ions, which are used in the first and second phases, may be 2:1 to 1:5, preferably from 1:1.5 to 1:3. ammonium sulfate or ammonium chloride, for example, may be used as ammonium salts before ageing. In one embodiment of the invention precipitation of the white paste is effected by the simultaneous or successive introduction into the reaction vessel with water, under constant stirring, of aqueous potassium ferrocyanide solution and iron (II) sulfate solution, followed in the second phase by the simultaneous or successive addition, under constant stirring, of sodium ferrocyanide solution and the same iron (II) sulfate solution as in the first phase.

The concentration of the potassium ferrocyanide solution may be 60±40 g/l [Fe(CN)$_6$]. The concentration of the sodium ferrocyanide solution may be 60±40 g/l [Fe(CN)$_6$]. The concentration of the iron (II) sulfate solution may be 200±150 g/l FeSO$_4$.7H$_2$O. The [Fe(CN)$_6$] and FeSO$_4$ may be used in a molar ratio of 1:1.7±0.2. Iron (II) chloride solution may also be used in place of the iron (II) sulfate solution.

The volume of water in the reaction vessel and precipitation solutions is selected to suit the solution concentrations. The white paste concentration after precipitation may be 30±20 g/l [Fe(CN)$_6$]. The volume of water in the reaction vessel may be 25–30% by volume of the total volume of white paste suspension present after precipitation. The complete white paste precipitation process may be carried out in such a way that an excess of 1.5±0.5 g/l Fe is present in the white paste filtrate.

The addition rate of the solutions is governed by their volume. The addition time of the solutions may in this case be 60±30 minutes, in which case the ratio of the precipitation times of the first and second phases of precipitation will correspond to the molar ratio of the ferrocyanides. The temperature of the water in the reaction vessel and precipitation solutions may vary between 15° and 70° C. and they should be mutually adjusted so that precipitation of the white paste occurs at 40°±20° C.

The potassium ferrocyanide/sodium ferrocyanide ratio may vary from 1:2 to 2:1, the preferred ratio being 1:1.6. The quantity of ammonium sulfate, which is added before ageing of the white paste, may be 0.1–2 moles, preferably 0.25–1 mole (NH$_4$)$_2$SO$_4$ per mole [Fe(CN)$_6$] and is governed by the ratio in which the ferrocyanides are used for precipitation of the white paste. The ammonium sulfate may be added in the form of an aqueous solution in a concentration of 50–450 g/l or as a solid salt. In this embodiment of the invention the iron (II) sulfate solution may be present initially, in which case it will have a concentration of 150±100 g/l.

In another embodiment of the invention, precipitation of the white paste is effected by the simultaneous introduction in the first phase into a reaction vessel containing an aqueous hydrocyanic acid solution, under constant stirring, of aqueous iron (II) sulfate solution and aqueous potassium hydroxide solution, followed in the second phase by the simultaneous addition of the same aqueous iron (II) sulfate solution as in the first phase and aqueous sodium hydroxide solution. In this embodiment of the invention, the potassium hydroxide may be replaced by potassium carbonate and the sodium hydroxide by sodium carbonate, the concentration of the potassium carbonate solution being 150±130 g/l K$_2$CO$_3$ and the concentration of the sodium carbonate solution 150±130 g/l.

The concentration of the aqueous iron (II) sulfate solution may in this case be 200±150 g/l. Iron (II) chloride solution may also be used in place of the iron (II) sulfate solution. The concentration of the aqueous potassium hydroxide solution may be 200±180 g/l and the concentration of the aqueous sodium hydroxide solution may be 200±180 g/l. The volume of the initial aqueous HCN solution may be 25–50% by volume of the total volume of the white paste suspension obtained after precipitation. The overall white paste precipitation process should be carried out in such a way that an excess of 1.5±0.5 g/l Fe is present in the white paste filtrate. The white paste concentration after precipitation may be 30±20 g/l [Fe(CN)$_6$].

The addition rate of the solutions is governed by their volume. The addition time of the solutions may be 60±30 minutes in which case the ratio of the precipitation times of the first and second phases of white paste precipitation will correspond to the molar ratio of the alkali metal hydroxide and carbonate solutions. The potassium hydroxide/sodium hydroxide and potassium carbonate/sodium carbonate molar ratios may vary from 1:9 to 2:1. The preferred molar ratio is 1:3 to 1:5. The HCN:FeSO$_4$ molar ratio may be 1:0.4±0.1. The quantity of ammonium sulfate, which is added before ageing of the white paste, may be 0.1–2.0 moles, preferably 0.25–1 mole (NH$_4$)$_2$SO$_4$ per mole [Fe(CN)$_6$] and is governed by the ratio in which the alkali metal hydroxides are introduced for precipitation of the white paste. The ammonium sulfate may in this case be added in the form of an aqueous solution with a concentration of 50–450 g/l or as a solid salt.

The two-phase white paste precipitation according to the invention can also be carried out by the simultaneous addition of aqueous iron (II) sulfate solution and aqueous potassium cyanide solution to the reaction vessel containing water, followed by the simultaneous addition in the second phase, with continued stirring, of the same aqueous iron (II) sulfate solution as in the first phase and aqueous sodium cyanide solution. The concentration of the aqueous iron (II) sulfate solution, which is added in the first or second phase, may be 200±150 g/l. An iron (II) chloride solution can also be used in place of the iron (II) sulfate solution. The concentration of the aqueous potassium cyanide solution may be 200±180 g/l. The concentration of the aqueous sodium cyanide solution may be 200±180 g/l.

The initial volume of water in the reaction vessel and the volume of the precipitation solutions are selected to suit the solution concentrations. The white paste concentration after precipitation may be 30±20 g/l [Fe(CN)$_6$]. The initial volume of water in the reaction vessel may be 25–50% by volume of the total volume of white paste suspension present after precipitation. The overall white paste precipitation process may be carried out in such a way that an excess of 1.5±0.5 g/l Fe is present in the white paste filtrate.

The addition rate of the solutions is governed by their volume. The addition time of the solutions may in this case be 60±30 minutes, in which case the ratio of the precipitation times of the first and second phases of the white paste precipitation process correspond to the molar ratio of the cyanide solutions. The potassium cyanide/sodium cyanide molar ratio may vary from 1:9 to 2:1. The preferred molar ratio is 1:3 to 1:5. The CN/FeSO$_4$ molar ratio may be 1:0.4±0.1. The quantity of ammonium sulfate, added before ageing of the white paste, may be 0.1–2.0 moles, preferably 0.25–1 mole (NH$_4$)$_2$SO$_4$, and is governed by the ratio in which the cyanides are added for precipitation of the white paste. The ammonium sulfate may be added in this case in the form of an aqueous solution with a concentration of 50–450 g/l or as a solid salt.

In a further embodiment of the invention, precipitation of the white paste is effected by the simultaneous or successive addition in the first phase, under constant stirring, to a reaction vessel containing water, in which if necessary FeSO4 has been dissolved, of an aqueous iron (II) sulfate solution and an aqueous solution of potassium ferrocyanide and potassium sulfate, followed in the second phase, under continued stirring, by the simultaneous or successive addition of the same iron (II) sulfate solution as in the first phase and of an aqueous solution of sodium ferrocyanide and sodium sulfate.

The concentration of the iron (II) sulfate solution may be 200±150 g/l FeSO4.7H2O. An iron (II) chloride solution may also be used in place of the iron (II) sulfate solution. The potassium ferrocyanide/potassium sulfate molar ratio in the [Fe(CN)6] solution may be between 1:0.5 and 1:1.5, but should preferably be 1:1. The [Fe(CN)6] concentration may in this case be 60±40 g/l. The sodium ferrocyanide/sodium sulfate molar ratio in the [Fe(CN)6] solution may be between 1:0.5 and 1:1.5, preferably 1:1. The [Fe(CN)6] concentration may in this case be 60±40 g/l.

The initial volume of water in the reaction vessel and the initial volume of precipitation solutions are selected to suit the solution concentrations. The white paste concentration after precipitation may be 30±20 g/l Fe(CN)6. The initial volume in the reaction vessel may be 25-50% by volume of the total volume of white paste suspension present after precipitation. The complete white precipitation process may be carried out in such a way that an excess of 1.5±0.5 g/l Fe is present in the white paste filtrate.

The addition rate of the solutions is governed by their volume. The addition time of the solution may be 60±30 minutes, in which case the ratio of the precipitation times of the first and second phases of the precipitation corresponds to the molar ratio of the ferrocyanides. The temperatures of the precipitation solutions may vary from 15° to 75° C. and should be mutually adopted so that white paste precipitation occurs at temperatures of 40°±20° C.

The potassium ferrocyanide/sodium ferrocyanide molar ratio may vary from 1:9 to 2:1. The preferred molar ratio is 1:3 to 1:5. [Fe(CN)6] and Fe2SO4.7H2O may be used in a molar ratio of 1:1.7±0.2. The quantity of ammonium sulfate, which is added before ageing of the white paste, may be 0.1-2.0 moles, preferably 0.25-1 mole (NH4)2SO4 per mole [Fe(CN)6] and is governed by the ratio in which the ferrocyanides are added for precipitation of the white paste. The ammonium sulfate may in this case be introduced in the form of an aqueous solution with a concentration of 50-450 g/l or as a solid salt.

In a further embodiment of the invention, a small proportion of the ferrosulfate, e.g. 10%±5% of the total quantity, may be dissolved in the initial volume of water in the reaction vessel. The whole quantity of ferrosulfate solution may also be used, in which case the iron (II) sulfate solution may have a concentration of 150±100 g/l. FeCl2 may also be used as an iron salt in place of FeSO4.

Subsequent processing of the white paste into iron blue pigment is carried out by known methods. Ageing is carried out in the autoclave in accordance with DE-PS No. 11 88 232, the entire disclosure of which is incorporated herein by reference. It is also possible, however, for the white paste to be boiled under normal pressure. The subsequent oxidation is carried out in an acid medium after the addition of an aqueous inorganic acid solution, for example HCl or H2SO4, using known oxidizing agents such as sodium chlorate, potassium chlorate, hydrogen peroxide, potassium or sodium dichromate.

After oxidation, the reaction salts are eliminated either by decanting of the iron blue pigment suspension or by washing of the iron blue pigment filter cake in the filter press after filtration of the iron blue pigment suspension. The iron blue pigment filter cake is then dried and ground to a powder. It is also possible to incorporate the aqueous filter cake of the iron blue pigment directly into the binder. Methods of this type are known, for example, under the name of flushing methods.

The process according to the invention enables the quantity of expensive potassium ferrocyanide to be substantially reduced, although the iron blue pigment produced this way exhibits all the required desirable properties and is in consequence qualitatively superior to iron blue pigments available on the market. The invention is based on the concept of precipitating a determined proportion of the white paste in the absence of sodium ions in order to obtain the particle shape, particle size and chemical composition required for the use of the iron blue pigment. The substantial modification of the white paste precipitation by comparison with known methods, is the successive use of solutions for white paste precipitation in place of mixtures of potassium and sodium ferrocyanide solutions.

The first stage, for example, is the precipitation of white paste from the potassium ferrocyanide and iron salt solution, after which, on the basis of this precipitate, precipitation is carried out in the same reaction vessel from the sodium ferrocyanide and iron salt solution in the presence of the reaction salts present in the solution. The quantity of potassium ferrocyanide and the white paste fraction, which is precipitated from potassium ferrocyanide, is calculated so that the exact number of potassium ions are used. This is necessary in order to obtain, after the subsequent white paste precipitation from sodium ferrocyanide, the required white paste composition.

The potassium ions, remaining in solution during the first phase of precipitation from the potassium ferrocyanide and iron salt solution, are almost completely reacted during the subsequent precipitation from sodium ferrocyanide in the second phase. After completion of the white paste precipitation, the filtrate contains primarily sodium ions. It is possible, for example, by the process according to the invention to use a lesser quantity of potassium ferrocyanide than is required in known processes.

The invention acquires importance, in particular, in connection with the use as raw material of ferrocyanide solutions containing additional alkali metal ions as a result of their production process. Ferrocyanide solutions with high alkali metal concentrations are produced for example by the following reactions:

6 KCN+FeSO4→K4Fe(CN)6+K2SO4 or

6 NaCN+FeSO4→Na4Fe(CN)6+Na2SO4

One advantage of this process, in contrast to other methods of ferrocyanide production, is that no residues are produced during the reaction. No problems arise with regard to disposal of by-products with a cyanide content.

Higher concentrations of potassium ions render the solution substantially more expensive, so that no economical iron blue pigment production would generally be possible based on a potassium ferrocyanide/potassium sulfate solution. It is therefore necessary to introduce at least a proportion of the ferrocyanide in the form of a sodium ferrocyanide/sodium sulfate solution. If a proportion of the ferrocyanide consists of a sodium ferrocyanide/sodium sulfate solution, in all previously known methods of production this gives rise as a result of the high sodium ion concentration to iron blue pigments which do not meet the high requirements of consumers. The color shade of these iron blue pigments does not have the necessary purity. The additional poor dispersion gives rise to glossy and weak-colored printing inks.

Use of the method of precipitation according to the present invention is valuable for two reasons, for example, in connection with use of the described ferrocyanide solutions which contain in addition alkali metal ions.

It is possible in the first place to produce iron blue pigment of high quality in all respects and at the same time to reduce raw material costs by optimal utilization of the potassium ions present. In the process according to the invention, for example, white paste is first precipitated from a potassium ferrocyanide/potassium sulfate solution. The use of said solution enables initially 25-30% of the total number of 6 potassium ions present per mole of [Fe(CN)$_6$] to be reacted during precipitation. The potassium ions, which do not participate in the reaction, remain in solution. This valuable salt solution is largely used up during the subsequent white paste precipitation from the sodium ferrocyanide/sodium sulfate solution and iron salt solution by reaction of the potassium ions preferably with [Fe(CN)$_6$] whereas the sodium ions remain in solution. In spite of the high sodium ion concentration, the surprising result obtained by the process according to the invention is that the ferrocyanide salt ratio is substantially altered in favor of the less expensive sodium ferrocyanide/sodium sulfate solution.

Of even greater practical importance than the economical raw material basis is the fact that it has very surprisingly been found possible by the process according to the invention to produce from the described ferrocyanide solution high-quality iron blue pigments in spite of the predominance of sodium ions. Economic considerations obviously require that as little potassium as possible should be used. It may however, be possible, and for special pigment varieties useful, to predominantly use potassium ferrocyanide.

When using ferrocyanide solutions which contain additional alkali metal ions, the potassium ferrocyanide/sodium ferrocyanide molar ratio should preferably be 1:3 to 1:5. 15-25% of the white paste is precipitated from the potassium ferrocyanide/potassium sulfate solution, followed by 75-85% white paste from the sodium ferrocyanide/sodium sulfate solution. The technical advance obtained by this process is found partly in the fact that the new method of white paste precipitation enables the quantity of potassium used during the precipitation process to be reduced, so that raw material costs are saved, while at the same time the iron blue pigments retain all the characteristic properties of high-quality varieties. In addition, the new process enables sodium ferrocyanide solutions with substantial additional quantities of sodium ions to be used as ferrocyanides in addition to the corresponding potassium ferrocyanide solutions, obtaining in this way iron blue pigments with particularly pure color shade, a good coloring power and very good dispersion characteristics, which yield highly brilliant gravure printing inks and, especially in the blue-pigmented toluene rotogravure printing inks which are widely used, can replace more phthalocyanine blue than iron blue pigments produced by previously known methods. The production of these iron blue pigments, using this sodium ferrocyanide solution, was not possible in accordance with the prior state of the art.

The process according to the invention is explained in greater detail and described on the basis of the following examples.

Testing of the iron blue pigments is carried out by the same method in all examples. For example, grinding and mixing is carried out in accordance with DIN 53 204 on a pigment grinding machine, and color measurement of the applied pigment in accordance with DIN 53 234, using the Elrephomat DFC 5 color measuring instrument. Determination of the color locations and color differences is carried out in accordance with DIN 6174.

Reference pigment 1 was produced by known processes, mixtures of pure potassium/sodium ferrocyanides being used during ageing in molar ratios of 1:1 with 0.5 mole K$_2$SO$_4$. Reference pigment 2 was produced by known methods, mixtures of ferrocyanide solutions containing 1.0 to 1.5 moles sodium and potassium sulfate being used during ageing in molar ratios of 1:1 with 0.5 mole K$_2$SO$_4$.

Tests of the dispersion capacity in rotogravure binders and brilliance measurements were carried out in all examples by the following method:

1. Quantities weighed in: in 250 ml glass flask with screw caps:
   300 g steel balls 3 mm in diameter
   20 g blue powder
   64.5 g 50% gravure printing binder in toluene
   40.5 g toluene
2. Dispersion: 120 minutes in a "Red Devil" vibrator.
3. Prints with hand coater on gravure paper.
4. Brilliance measurement with Dr. Lange reflectometer (residual brilliance in %).

The reaction capacity was tested in all examples by the following method:

40 g iron blue pigment was converted into a paste with 60 g linseed oil alkyd resin/refined linseed oil in a 1:1 ratio and dispersed on the three-roll mill (three passages). The distribution was checked with the grindometer; fineness to be less than 5μ.

Color test (25% iron blue pigment):

90 g of the ground paste was mixed with 54 g of the linseed oil alkyd resin/refined linseed oil and again applied to the three-roll mill.

Viscosity testing was carried out in all examples by Höppler's method. The first measurement was taken after 15-30 minutes tempering at 20° C. and the second measurement after 22 hours ageing at 50° C. followed by 15-30 minutes tempering at 20° C. The reaction capacity of the iron blue pigment was obtained from the increase in viscosity at the time of the second measurement, measured in %, by comparison with the first measurement.

EXAMPLE 1

5 Liters water are introduced into a reaction vessel and heated to a temperature of 40° C. The following solutions are introduced simultaneously into the vessel within a period of 15 minutes:
   1700 ml potassium ferrocyanide solution
      Concentration: 85 g/l [Fe(CN)$_6$]
      Temperature: 40° C.
   1450 ml iron (II) sulfate solution pH values of the iron (II) sulfate solution and the [Fe(CN)$_6$] solution are adjusted so that the precipitate has a pH of 3.0-3.5. The subsequent treatment of the white paste is as described in Example 1. Tests on the iron blue pigment thus obtained yielded the values shown in Tables I and II.

TABLE I

Coloring Power, Color Locations and Color Differences in Accordance with CIE, L*, a*, b*, C*, Using the Elrephomat DFC 5 (Pigment grinding with TiO$_2$ 1:20)

| Pigment | Coloring power K/S value | % | CIE color locations L* | a* | b* | C* | Color differences ΔL | Δa | Δb | ΔC | Result |
|---|---|---|---|---|---|---|---|---|---|---|---|
| Reference pigment (1) | 0.536959 | 100% | 54.1 | −13.6 | −31.5 | 34.3 | 0 | 0 | 0 | 0 | Reference value |
| Pigment of Example 1 | 0.564752 | 105% | 53.4 | −13.3 | −32.2 | 34.9 | −0.7 | 0.2 | −0.8 | 0.6 | Darker, bluer, purer |

The potassium, sodium and ammonium contents were 1.6%, 0.6% and 3.5% by weight, respectively.

TABLE II

Improvement with Respect to Raw Material Costs and Pigment Quality, Based on the Present State of Technology

| Pigment | Raw material charge Total quantity of alkali metal | Coloring power Color shade | Dispersion capacity Gravure printing agent Residual brilliance in % | Reaction capacity Increase in viscosity in % |
|---|---|---|---|---|
| Reference Pigment (1) | 3.0 moles potassium per mole Fe(CN)$_6$ | 100% pure blue* | 22-23% | about 40% |
| Pigment of Example 1 | 1.5 moles potassium 1.0 mole ammonium per mole Fe(CN)$_6$ | 105% pure blue* | 30-35% | about 40% |

*in relation to the iron blue pigment color shade.

Concentration: 200 g/l FeSO$_4$.7H$_2$O
   Temperature: 25° C.

This is followed within 45 minutes by the simultaneous introduction into the precipitated white paste, under constant stirring, of:
   2700 ml sodium ferrocyanide solution
      Concentration: 85 g/l [Fe(CN)$_6$]
      Temperature 40° C.
   2200 ml iron (II) sulfate solution (temperature and concentration as given above).

The pH values of the iron (II) sulfate solution and the [Fe(CN)$_6$] solutions are adjusted so that the precipitate has a pH of 3.0-3.5. An excess of 1.5 g/l Fe is present in the white paste filtrate throughout the precipitation process.

The white paste is diluted to 18,000 ml with water and the supernatant liquid drawn off after sedimentation. After the addition of 116 g ammonium sulfate in the form of an aqueous solution (concentration: 400 g/l (NH$_4$)$_2$SO$_4$), ageing of the white paste is carried out in accordance with DE-PS No. 11 88 232 by heating to 110° C. in the autoclave. The temperature of 110° C. is maintained for 60 minutes. After cooling to 65° C. (with constant stirring), the white paste is oxidized to iron-blue pigment by the addition of 90 g HCl (in the form of a 10-15% aqueous solution) and 44 g NaClO$_3$ (in the form of an approximately 30% aqueous solution). The results of the tests on the iron blue pigment thus obtained have been summarized in Tables I and II.

EXAMPLE 1a

5 Liters iron (II) sulfate solution is introduced into a reaction vessel (concentration: 90 g/l FeSO$_4$.7H$_2$O) and heated to a temperature of 40° C. Within 15 minutes 1700 ml potassium ferrocyanide solution (concentration: 85 g/l [Fe(CN)$_6$]; temperature 40° C.) are introduced initially into this solution, followed within 45 minutes by 2700 ml sodium ferrocyanide solution (concentration: 85 g/l [Fe(CN)$_6$]; temperature 40° C.). The

EXAMPLE 2

160 g HCN are introduced into 3000 ml water at a temperature of 25° C. in a closed reaction vessel. The following solutions are introduced simultaneously within 15 minutes under constant stirring:
   750 ml iron (II) sulfate solution
      Concentration: 200 g/l FeSO$_4$.7H$_2$O
      Temperature: 25° C.
   750 ml potassium hydroxide solution
      Concentration: 110 g/l
      Temperature: 40° C.

The pH value of the iron (II) sulfate solution is adjusted so that the precipitate has a pH of 3.5-4.0. 2250 ml iron (II) sulfate solution (concentration, pH and temperature as above) are then introduced within 45 minutes into the precipitated white paste simultaneously with:
   2250 ml sodium hydroxyde solution
      Concentration: 80 g/l
      Temperature: 40° C.

An excess of 1.5 g/l Fe is present in the white paste filtrate throughout the white paste precipitation process. The white paste is diluted to 18,000 ml with water and the supernatant liquid drawn off after sedimentation; this is followed by a further dilution to 18,000 ml with water and a further drawing off of the supernatant solution after sedimentation of the white paste.

After the addition of 66 g ammonium sulfate in the form of an aqueous solution (concentration: 400 g/l), the white paste is aged in accordance with DE-PS No. 11 88 232 by heating to 105° C. in the autoclave. The temperature of 10% C. is maintained for 60 minutes. After cooling to 65° C. under constant stirring, the white paste is oxidized to iron-blue pigment by the addition of 50 g HCl in the form of a 15% aqueous solution and 25 g sodium chloride (in the form of a 30% aqueous solution). The results of tests on the iron blue pigment thus obtained have been summarized in Tables III and IV.

Temperature: 25° C.

The pH values of the iron (II) salt solution and the

TABLE III

Coloring Power, Color Locations and Color Differences in Accordance with CIE, L*, a*, b*, C*, Using the Elrephomat DFC 5 (Pigment grinding with TiO₂ 1:20)

| Pigment | Coloring power K/S value | % | CIE color locations L* | a* | b* | C* | Color differences ΔL | Δa | Δb | ΔC | Result |
|---|---|---|---|---|---|---|---|---|---|---|---|
| Reference pigment (1) | 0.536959 | 100% | 54.1 | −13.6 | −31.5 | 34.3 | 0 | 0 | 0 | 0 | Reference value |
| Reference pigment (2) | 0.526220 | 98% | 54.5 | −12.8 | −30.9 | 33.7 | 0.3 | 0.8 | 0.6 | 0.6 | Redder yellower, dirtier |
| Pigment of Example 2 | 0.564752 | 105% | 53.4 | −13.3 | −32.3 | 34.9 | −0.7 | 0.2 | −0.8 | 0.6 | Darker, bluer, purer |

The potassium, sodium and ammonium contents were 1.8%, 0.4% and 3.2% by weight, respectively.

TABLE IV

Improvement with Respect to Raw Material Costs and Pigment Quality, Based on the Present State of Technology

| Pigment | Raw material charge Total quantity of alkali metal | Coloring power Color shade | Dispersion capacity Gravure printing agent Residual brilliance in % | Reaction capacity Increase in viscosity in % |
|---|---|---|---|---|
| Reference Pigment (1) | 3.0 moles potassium per mole Fe(CN)₆ | 100% pure blue* | 22–23% | about 40% |
| Reference Pigment (2) | 4.0 moles potassium per mole Fe(CN)₆ | 98% clearly redder and dirtier | 19–20% | about 40% |
| Pigment of Example 2 | 1.5 moles potassium 1.0 mole ammonium per mole Fe(CN)₆ | 105% pure blue* | 30–35% | about 40% |

*in relation to the iron blue pigment color shade.

EXAMPLE 3

3000 ml water is introduced into a closed reaction vessel at 40° C. The following solutions are introduced simultaneously within 15 minutes under constant stirring:

750 ml iron (II) sulfate solution
  Concentration: 200 g/l FeSO₄.7H₂O
  Temperature: 25° C.
750 ml potassium cyanide solution
  Concentration: 130 g/l KCN
  Temperature: 25° C.

This is followed within 45 minutes by the simultaneous introduction into the precipitated white paste, under constant stirring, of:

2250 ml iron (II) sulfate solution
  Concentration and temperature as above
2250 ml sodium cyanide solution
  Concentration: 100 g/l NaCN cyanide solution are adjusted so that the precipitate has a pH of 3.5–4.0. An excess of 1.5 g/l Fe is present in the white paste filtrate throughout the white paste precipitation process. The white paste is diluted to 18,000 ml with water. The supernatant solution is drawn off after sedimentation, followed by a further dilution to 18,000 ml with water and a further drawing off of the supernatant solution after sedimentation of the white paste.

After the addition of 66 g ammonium sulfate in the form of an aqueous solution (concentration: 400 g/l), the white paste is aged in accordance with DE-PS No. 11 88 232 by heating to 110° C. in the autoclave. The temperature of 110° C. is maintained for 60 minutes. After cooling to 65° C. under constant stirring, the white paste is oxidized to Prussian blue by the addition of 50 g HCl in the form of a 10–15% aqueous solution and 25 g sodium chlorate (in the form of a 30% aqueous solution). The results of tests on the iron blue pigment thus obtained have been summarized in Tables V and VI.

TABLE V

Coloring Power, Color Locations and Color Differences in Accordance with CIE, L*, a*, b*, C*, Using the Elrephomat DFC 5 (Pigment grinding with TiO₂ 1:20)

| Pigment | Coloring power K/S value | % | CIE color locations L* | a* | b* | C* | Color differences ΔL | Δa | Δb | ΔC | Result |
|---|---|---|---|---|---|---|---|---|---|---|---|
| Reference pigment (1) | 0.536959 | 100% | 54.1 | −13.6 | −31.5 | 34.3 | 0 | 0 | 0 | 0 | Reference value |
| Reference Pigment (2) | 0.526220 | 98% | 54.4 | −12.8 | −30.9 | 33.7 | 0.3 | 0.8 | 0.6 | −0.6 | Redder, yellower, dirtier |
| Pigment of Example 3 | 0.564752 | 105% | 53.4 | −13.2 | −32.3 | 34.9 | −0.7 | 0.2 | −0.8 | 0.6 | Darker, bluer, purer |

The potassium, sodium and ammonium contents were 1.5%, 0.5% and 3.5% by weight, respectively.

TABLE VI

Improvement with Respect to Raw Material Costs and Pigment Quality,
Based on the Present State of Technology

| Pigment | Raw material charge Total quantity of alkali metal | Coloring power Color shade | Dispersion capacity Gravure printing agent Residual brilliance in % | Reaction capacity Increase in viscosity in % |
| --- | --- | --- | --- | --- |
| Reference Pigment (1) | 3.0 moles potassium per mole Fe(CN)$_6$ | 100% pure blue* | 22–23% | about 40% |
| Reference Pigment (2) | 4.0 moles potassium per mole Fe(CN)$_6$ | 98% clearly redder and dirtier | 19–20% | about 40% |
| Pigment of Example 3 | 1.5 moles potassium 1.0 mole ammonium per mole Fe(CN)$_6$ | 105% pure blue* | 30–35% | about 40% |

*in relation to the iron blue pigment color shade.

EXAMPLE 4

5 Liter water is introduced into a reaction vessel and heated to a temperature of 40° C. The following aqueous solutions are introduced simultaneously into the vessel within 15 minutes:
  500 ml iron (II) sulfate solution
    Concentration: 350 g/l FeSO$_4$.7H$_2$O
    Temperature: 20° C.
  1100 ml potassium ferrocyanide/potassium sulfate solution (molar ratio 1:1)
    Concentration: 85 g/l [Fe(CN)$_6$]
    Temperature: 40° C.
This is followed within 45 minutes by the simultaneous introduction into the precipitated white paste, under constant stirring, of:
  1500 ml sodium ferrocyanide/sodium sulfate solution (molar ratio 1:1)
    Concentration: 85 g/l [Fe(CN)$_6$]
    Temperature: 40° C.
The pH values of the iron (II) sulfate solution and the [Fe(CN)$_6$] solutions are adjusted so that the precipitate has a pH of 3.0–3.5. An excess of 1.5 g/l Fe is present in the white paste filtrate throughout the white paste precipitation process.

The white paste suspension is diluted to 18,000 ml with water. After sedimentation the supernatant solution is drawn off, followed by a further dilution to 18,000 ml with water and a further drawing off of the supernatant solution after sedimentation of the white paste. After addition of 116 g of ammonium sulfate in the form of an aqueous solution (concentration: 400 g/l), the white paste is aged in accordance with DE-PS No. 11 88 232 by heating to 110° C. in the autoclave. The temperature of 110° C. is maintained for 60 minutes. After cooling to 65° C. under constant stirring, the white paste is oxidized to Prussian blue by the addition of 90 g HCl (in the form of a 15% aqueous solution) and 44 g NaClO (in the form of a 30% aqueous solution). After oxidation, the iron blue pigment suspension is filtered, rinsed and the filter cake dried.

EXAMPLE 5

5 Liter iron (II) sulfate solution (concentration: 140 g/l FeSO$_4$.7H$_2$O) is introduced into a reaction vessel and heated to a temperature of 40° C. Within 15 minutes, 1100 ml potassium ferrocyanide/potassium sulfate solution (molar ratio 1:1, concentration 85 g/l [Fe(CN)$_6$], temperature 40° C.) is introduced initially into this solution, followed within 45 minutes by 3300 ml sodium ferrocyanide/sodium sulfate solution (molar ratio 1:1, concentration 85 g/l [Fe(CN)$_6$], temperature 40° C.). The pH values of the iron (II) sulfate solution and of the [Fe(CN)$_6$] solutions are adjusted so that the precipitate has a pH of 3.0–3.5. The Fe concentration in the filtrate after precipitation of the white paste is 1.5 g/l Fe. Subsequent treatment of the white paste is as described in example 4.

EXAMPLE 6

Pigment production is as described in Example 4, except that the initial temperature in the reaction vessel is 18°–20° C. and the temperature of the precipitation solution is 20°–22° C. 175 g ammonium sulfate is added in the form of an aqueous solution (concentration: 400 g/l) before ageing.

EXAMPLE 7

35 g FeSO$_4$.7H$_2$O are dissolved in a reaction vessel in 5000 ml water at a temperature of 18°–20° C. The following solutions are then added within 20 minutes under constant stirring:
  2500 ml iron (II) sulfate solution
    Concentration: 110 g/l FeSO$_4$.7H$_2$O
    Temperature: 20° C.
  2530 ml potassium ferrocyanide/potassium sulfate solution (molar ratio 1:1)
    Concentration: 50 g/l Fe(CN)$_6$
    Temperature: 20° C.
This is followed within 40 minutes by the simultaneous introduction into the precipitated white paste, under constant stirring, of:
  5000 ml iron (II) sulfate solution (concentration and temperature as above)
  5070 ml sodium ferrocyanide/sodium sulfate solution (molar ratio 1:1)
    Concentration: 50 g/l Fe(CN)$_6$
    Temperature: 20° C.
The pH values of the iron (II) sulfate solution and of the [Fe(CN)$_6$] solutions are adjusted so that the precipitate has a pH of 3.0–3.5. An excess of 1.5 g/l Fe is present in the white paste filtrate throughout the white paste precipitation process.

After sedimentation of the white paste the supernatant solution is drawn off, the residue diluted to 18,000 ml with water and the supernatant solution again drawn off after sedimentation of the white paste. After addition of 232 g ammonium sulfate in the form of an aqueous solution (concentration: 400 g/l), ageing is carried out in accordance with DE-PS No. 11 88 232 by heating to 110° C. in the autoclave. The temperature of 110° C. is maintained for 60 minutes. After cooling to 65° C. under constant stirring, the white paste is oxidized to Prussian blue by the addition of 90 g HCl (in the form of a 10–15% solution) and 44 g sodium chlorate (in the form of a 30% solution). After oxidation, the iron blue pigment suspension is filtered, rinsed and the filter cake dried.

EXAMPLE 8

5 Liter water is introduced into a reaction vessel (at a temperature of 20° C.). Within a period of 10 minutes, the following aqueous solutions are introduced, under constant stirring, into the reaction vessel with water:
  467 ml iron (II) sulfate solution
    Concentration: 250 g/l FeSO$_4$.7H$_2$O
    Temperature: 20° C.
  733 ml potassium ferrocyanide/potassium sulfate solution (molar ratio 1:1)
    Concentration: 85 g/l [Fe(CN)$_6$]
    Temperature: 30° C.
The following quantities are then introduced within 50 minutes into the precipitated white paste under constant stirring:
  2333 ml iron (II) sulfate (concentration and temperature as above)
  3667 ml sodium ferrocyanide/sodium sulfate solution (molar ratio 1:1)
    Concentration: 85 g/l [Fe(CN)$_6$]
    Temperature: 30° C.

The pH values of the iron (II) sulfate solution and the [Fe(CN)$_6$] solutions are adjusted so that the precipitate has a pH of 3.0–3.5. An excess of 1.5 g/l Fe is present in the white paste filtrate throughout the precipitation process.

The white paste suspension is diluted with water to 18,000 ml. After sedimentation is complete, the supernatant solution is drawn off, followed by further dilution with water to 18,000 ml and further drawing off of the supernatant solution after sedimentation of the white paste. After the addition of 116 g ammonium sulfate in the form of an aqueous solution (concentration: 400 g/l), ageing of the white paste is carried out in accordance with DE-PS No. 11 88 232 by heating to 110° C. in the autoclave. The temperature of 110° C. is maintained for 60 minutes. After cooling to 65° C., the white paste is oxidized to Prussian blue under constant stirring by the addition of 90 g HCl (in the form of a 15% aqueous solution) and 44 g NaClO (in the form of a 30% aqueous solution). After oxidation, the iron blue pigment suspension is filtered, rinsed and the filter cake dried.

The results of tests on the iron blue pigments thus obtained have been summarized in Tables VII and VIII:

TABLE VII

Improvement with Respect to Raw Material Costs and Pigment Quality, Based on the Present State of Technology

| Pigment | Raw material charge Total quantity of alkali metal | Coloring power Color shade | Dispersion capacity Gravure printing agent Residual brilliance in % | Reaction capacity Increase in viscosity in % |
|---|---|---|---|---|
| Reference Pigment (1) | 3.0 moles potassium per mole Fe(CN)$_6$ | 100% pure blue* | 22–23% | about 40% |
| Reference Pigment (2) | 4.0 moles potassium per mole Fe(CN)$_6$ | 98% clearly redder and dirtier | 19–20% | about 40% |
| Pigment of Examples 4 and 5 | 1.5 moles potassium 1.0 mole ammonium per mole Fe(CN)$_6$ | 105% pure blue* | 30–35% | about 40% |
| Pigment of Example 6 | 1.5 moles potassium 1.5 moles ammonium per mole Fe(CH)$_6$ | 110% pure blue* | 30–35% | about 40% |
| Pigment of Example 7 | 2.0 moles potassium 2.0 moles ammonium per mole Fe(CN)$_6$ | 115% pure blue* | Special pigment for the paint industry Brilliance in gravure printing and reaction capacity are of no concern | |
| Pigment of Example 8 | 1.0 mole potassium 1.0 mole ammonium per mole Fe(CN)$_6$ | 105% pure blue-red | 30–35% | about 40% |

*in relation to the iron blue color shade.

TABLE VIII

Coloring Power, Color Locations and Color Differences in Accordance with CIE, L*, a*, b*, C*, Using the Elrephomat DFC 5 (Pigment grinding with TiO$_2$ 1:20)

| Pigment | Coloring power K/S value | % | CIE color locations L* | a* | b* | C* | Color differences ΔL | Δa | Δb | ΔC | Result |
|---|---|---|---|---|---|---|---|---|---|---|---|
| Reference pigment (1) | 0.536959 | 100% | 54.1 | −13.6 | −31.5 | 34.3 | 0 | 0 | 0 | 0 | Reference value |
| Reference Pigment (2) | 0.526220 | 98% | 54.4 | −12.8 | −30.9 | 33.7 | 0.3 | 0.8 | 0.6 | −0.6 | Redder yellower dirtier |
| Pigment of Example 4 and 5 | 0.564752 | 105% | 53.4 | −13.3 | −32.2 | 34.9 | −0.7 | 0.2 | −0.8 | 0.6 | Darker, bluer purer |
| Pigment of Example 6 | 0.587970 | 110% | 53.0 | −13.2 | −32.8 | 35.5 | −1.1 | 0.3 | −1.3 | 1.2 | Darker, bluer, purer |
| Pigment of Example 7 | 0.616966 | 115% | 53.0 | −13.3 | −33.2 | 35.7 | −1.1 | 0.3 | −1.7 | 1.4 | Darker bluer, purer |
| Pigment of | 0.564752 | 105% | 53.4 | −12.4 | −31.6 | 34.2 | −0.7 | 1.2 | −0.1 | −0.1 | Darker, |

TABLE VIII-continued

Coloring Power, Color Locations and Color Differences in Accordance with
CIE, L*, a*, b*, C*, Using the Elrephomat DFC 5 (Pigment grinding with TiO$_2$ 1:20)

| Pigment | Coloring power K/S value | % | CIE color locations | | | | Color differences | | | | Result |
|---|---|---|---|---|---|---|---|---|---|---|---|
| | | | L* | a* | b* | C* | ΔL | Δa | Δb | ΔC | |
| Example 8 | | | | | | | | | | | redder |

In Example 4, the potassium, sodium and ammonium contents were 1.7%, 0.5% and 3.5% by weight, respectively.
In Example 5, the potassium, sodium and ammonium contents were 1.7%, 0.5% and 3.5% by weight, respectively.
In Example 6 the potassium, sodium and ammonium contents were 0.85%, 0.2% and 4.0% by weight, respectively.
In Example 7 the potassium, sodium and ammonium contents were 0.65%, 0.25% and 4.5% by weight, respectively.
In Example 8 the potassium, sodium and ammonium contents were 0.65%, 0.25% and 4.5% by weight, respectively.

What is claimed is:

1. Iron blue pigment, characterized by a potassium content of 0.5-4.5% by weight, a sodium content of 0.2-1.0% by weight, an ammonium content of 2.0-4.5% by weight, a coloring power in accordance with DIN 53 204 and DIN 53 234 of 5-15% above the Vossen Blue 705 Standard and the following color intervals determined in accordance with DIN 53 204 and DIN 53 234 in conjunction with DIN 6174, in relation to Vossen Blue 705 as standard:
   ΔL: −0.7 to −1.5
   Δa: −0.5 to 1.5
   Δb: −0.6 to −2.3
   ΔC: 0.5 to 2.0

2. Iron blue pigment according to claim 1 having a potassium content of 0.5-2.0% by weight and an ammonium content of 3.0-4.5% by weight.

3. In the process for the production of the iron blue pigment in accordance with claim 1 by means of white paste precipitation followed by oxidation of the white paste, the improvement which comprises carrying out the white paste precipitation with alkali metal ions, cyanide or complex iron cyanide ions and iron ions in two phases, adding potassium ions as alkali metal ions in the first phase of the white paste precipitation and sodium ions as alkali metal ions in the second phase, diluting the white paste suspension thus obtained with water, decanting the supernatant solution, adding ammonium salts, heating and maintaining the suspension at the boiling point thereof, cooling the suspension, adding inorganic salts in the form of an aqueous solution and oxidizing agents in the form of an aqueous solution and, after oxidation, separating the iron blue pigment from the solution.

4. The process according to claim 3 wherein precipitation of the white paste is effected by the simultaneous or successive introduction in the first phase of aqueous potassium ferrocyanide solution and iron (II) sulfate solution into a vessel with water under constant stirring, followed by the simultaneous or successive introduction under constant stirring in the second phase of sodium ferrocyanide solution and the same aqueous iron (II) sulfate solution as in the first phase.

5. The process according to claim 3 wherein the white paste precipitation is effected by the simultaneous introduction in the first phase into a reaction vessel under constant stirring of an aqueous hydrocyanic acid solution, an aqueous iron (II) sulfate solution and an aqueous potassium hydroxide solution, followed in the second phase by the simultaneous addition of an aqueous sodium hydroxide solution and the same aqueous iron (II) sulfate solution as in the first phase.

6. The process according to claim 3 wherein the white paste precipitation is effected by the simultaneous introduction in the first phase into a reaction vessel with water under constant stirring of an aqueous iron (II) sulfate solution and an aqueous potassium cyanide solution, followed in the second phase with continued stirring by the simultaneous addition of an aqueous sodium cyanide solution and the same aqueous iron (II) sulfate solution as in the first phase.

7. The process according to claim 3 wherein the white paste precipitation is effected by the simultaneous or successive introduction in the first phase under constant stirring into a vessel containing water in which necessary FeSO$_4$ has been dissolved, of an aqueous iron (II) sulfate solution and an aqueous potassium sulfate solution, followed in the second phase under continued stirring by the simultaneous or successive introduction of an aqueous sodium ferrocyanide and sodium sulfate solution and the same iron (II) sulfate solution as in the first phase.

8. The process according to claim 3 wherein the white paste precipitation is effected by the simultaneous introduction in the first phase, under constant stirring, into a reaction vessel containing an aqueous hydrocyanic acid solution of an aqueous iron (II) sulfate solution and a potassium carbonate solution, followed in the second phase by the simultaneous addition of an aqueous sodium carbonate solution and the same aqueous iron (II) sulfate solution as in the first phase.

9. The process which comprises utilizing the iron blue pigment according to claim 1 for the production of printing inks, colored paints, colored varnishes and coloring agents for fungicides.

10. A printing ink containing the iron blue pigment according to claim 1.

11. A colored paint containing the iron blue pigment according to claim 1.

12. A colored varnish containing the iron blue pigment according to claim 1.

13. A fungicide containing as coloring agent the iron blue pigment according to claim 1.

* * * * *